(12) United States Patent
Vijaya Kumar et al.

(10) Patent No.: US 11,875,677 B2
(45) Date of Patent: Jan. 16, 2024

(54) DETECTION AND REPORTING OF MISBEHAVIOR IN VEHICLE-TO-INFRASTRUCTURE COMMUNICATION

(71) Applicant: GM Global Technology Operations LLC, Detroit, MI (US)

(72) Inventors: Vivek Vijaya Kumar, Shelby Township, MI (US); Mohammad Naserian, Windsor (CA); Kemal E. Tepe, Detroit, MI (US); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 374 days.

(21) Appl. No.: 17/165,223

(22) Filed: Feb. 2, 2021

(65) Prior Publication Data

US 2022/0246031 A1 Aug. 4, 2022

(51) Int. Cl.
*G08G 1/0967* (2006.01)
*H04W 4/40* (2018.01)
*G08G 1/01* (2006.01)

(52) U.S. Cl.
CPC ..... *G08G 1/096716* (2013.01); *G08G 1/0112* (2013.01); *G08G 1/096741* (2013.01); *G08G 1/096775* (2013.01); *H04W 4/40* (2018.02)

(58) Field of Classification Search
None
See application file for complete search history.

(56) References Cited

U.S. PATENT DOCUMENTS

2022/0073106 A1* 3/2022 Ahn .................. H04W 4/40

FOREIGN PATENT DOCUMENTS

KR 20170120420 A * 10/2017 ............. G01S 19/13

OTHER PUBLICATIONS

Bentjen, Karl C., "Mitigating the Effects of Cyber Attacks and Human Control in an Autonomous Intersection" (2018). Theses and Dissertations. 1792. https://scholar.afit.edu/etd/1792 (Year: 2018).*
Geza Pesti, Ph.D., PE. "V2I Queue Advisory/Warning Applications: Concept and Design" (Jan. 15, 2021) https://engineering.virginia.edu/sites/default/files/common/Centers/CTS/CVPFS/projects/612141-00002_CVPFS_QueueWarning_Task5_HLD_Final.pdf (Year: 2021).*

\* cited by examiner

*Primary Examiner* — Maceeh Anwari
*Assistant Examiner* — Charles Pall
(74) *Attorney, Agent, or Firm* — CANTOR COLBURN LLP

(57) ABSTRACT

A method in a vehicle includes receiving a vehicle-to-infrastructure (V2I) message transmitted from a communication system affixed to infrastructure at a location. The V2I message includes at least one category of information among a plurality of categories of information and the plurality of categories of information include map-based information and road safety information. The method also includes determining, based on performing at least one type of verification, whether a misbehavior has occurred with respect to the V2I message. The misbehavior indicates incorrect information in the V2I message. A counter is maintained of a number of times the misbehavior has occurred with respect to the V2I message at the location, and the misbehavior is reported based on the counter.

20 Claims, 2 Drawing Sheets

DETECTION AND REPORTING OF MISBEHAVIOR IN VEHICLE-TO-INFRASTRUCTURE COMMUNICATION

INTRODUCTION

The subject disclosure relates to detection and reporting of a misbehavior in vehicle-to-infrastructure (V2I) communication.

Vehicle-to-vehicle (V2V) communication, V2I, and vehicle-to-everything (V2X) communication are increasingly used. These communication systems facilitate smart highways and are also important in autonomous vehicle operation. V2I communication includes informational messages broadcast to vehicles in a particular area via transmitters or transceivers that are affixed to infrastructure (e.g., at traffic signals, at construction sites, at road signs). Incorrect information broadcast by infrastructure is referred to as misbehavior. Misbehavior may be the result of malicious action or error. The misbehavior can cause a range of results from confusion to a collision. Accordingly, it is desirable to provide detection and reporting of misbehavior in V2I communication.

SUMMARY

In one exemplary embodiment, a method in a vehicle includes receiving a vehicle-to-infrastructure (V2I) message transmitted from a communication system affixed to infrastructure at a location. The V2I message includes at least one category of information among a plurality of categories of information and the plurality of categories of information include map-based information and road safety information. The method also includes determining, based on performing at least one type of verification, whether a misbehavior has occurred with respect to the V2I message. The misbehavior indicates incorrect information in the V2I message. A counter is maintained of a number of times the misbehavior has occurred with respect to the V2I message at the location, and the misbehavior is reported based on the counter.

In addition to one or more of the features described herein, the determining whether the misbehavior has occurred is performed prior to the vehicle passing through an area to which the V2I message pertains.

In addition to one or more of the features described herein, the method also includes disregarding the V2I message based on determining that the misbehavior has occurred.

In addition to one or more of the features described herein, the performing at least one type of verification includes comparing information in the V2I message with information obtained from one or more other vehicles via vehicle-to-vehicle (V2V) messages.

In addition to one or more of the features described herein, the performing at least one type of verification includes checking consistency and plausibility of each field of the V2I message based on rules corresponding with each field.

In addition to one or more of the features described herein, the performing at least one type of verification includes comparing information in the V2I message with information obtained with one or more sensors of the vehicle.

In addition to one or more of the features described herein, the performing at least one type of verification includes comparing driver behavior to expected driver behavior based on information in the V2I message.

In addition to one or more of the features described herein, the method also includes maintaining, by the controller, a counter threshold value that is specific to each type among a plurality of types of V2I messages, wherein one type among the plurality of types is a signal phase and time (SPaT) V2I message associated with a traffic light.

In addition to one or more of the features described herein, the method also includes determining the type of the V2I message, wherein the reporting the misbehavior is based on the counter of the number of times the misbehavior has occurred exceeding the counter threshold value that is specific to the type of the V2I.

In addition to one or more of the features described herein, the method also includes receiving a second V2I message at the location and determining whether a misbehavior has occurred with respect to the second V2I message.

In another exemplary embodiment, a vehicle includes one or more sensors that include a camera, and a controller to receive a vehicle-to-infrastructure (V2I) message transmitted from a communication system affixed to infrastructure at a location. The V2I message includes at least one category of information among a plurality of categories of information and the plurality of categories of information include map-based information and road safety information. The controller may determined, based on performing at least one type of verification, whether a misbehavior has occurred with respect to the V2I message. The misbehavior indicates incorrect information in the V2I message. The controller may additionally maintain a counter of a number of times the misbehavior has occurred with respect to the V2I message at the location and report the misbehavior based on the counter.

In addition to one or more of the features described herein, the controller determines whether the misbehavior has occurred prior to the vehicle passing through an area to which the V2I message pertains.

In addition to one or more of the features described herein, the controller disregards the V2I message based on determining that the misbehavior has occurred.

In addition to one or more of the features described herein, the controller compares information in the V2I message with information obtained from one or more other vehicles via vehicle-to-vehicle (V2V) messages to identify the misbehavior.

In addition to one or more of the features described herein, the controller checks consistency and plausibility of each field of the V2I message based on rules corresponding with each field to identify the misbehavior.

In addition to one or more of the features described herein, the controller compares information in the V2I message with information obtained with one or more sensors of the vehicle to identify the misbehavior.

In addition to one or more of the features described herein, the controller compares driver behavior to expected driver behavior based on information in the V2I message to identify the misbehavior.

In addition to one or more of the features described herein, the controller maintains a counter threshold value that is specific to each type among a plurality of types of V2I messages, wherein one type among the plurality of types is a signal phase and time (SPaT) V2I message associated with a traffic light.

In addition to one or more of the features described herein, the controller determines the type of the V2I message and report the misbehavior based on the counter of the number of times the misbehavior has occurred exceeding the counter threshold value that is specific to the type of the V2I.

In addition to one or more of the features described herein, the controller receives a second V2I message at the location and determine whether a misbehavior has occurred with respect to the second V2I message.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
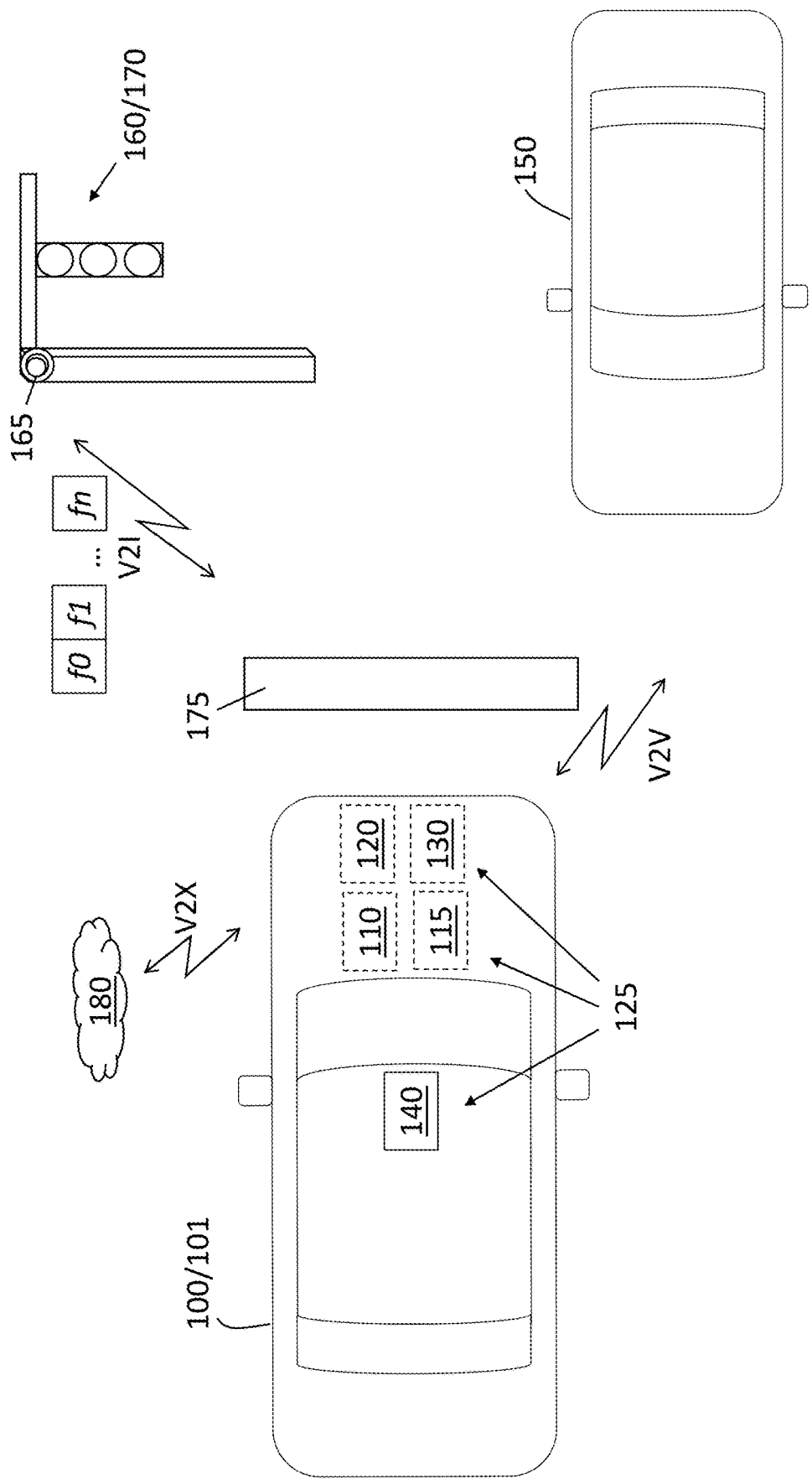
FIG. 1 is a block diagram of a vehicle that provides detection and reporting of a misbehavior in V2I communication according to one or more embodiments.

The following description is merely exemplary in nature and is not intended to limit the present disclosure, its application or uses. It should be understood that throughout the drawings, corresponding reference numerals indicate like or corresponding parts and features.

As previously noted, V2I communication includes informational messages broadcast to vehicles in a particular area. Exemplary categories of V2I communication include signal phase and time (SPaT) broadcasts that indicate current color and time to the next color at traffic lights, map broadcasts that indicate, for example, the location of a stop at a traffic light and maneuvers permitted at each of the lanes of a roadway, road safety broadcasts that specify, for example, a speed limit in the work zone, and traveler information messages. Misbehavior in any of these types of messages may result in consequences ranging from inconvenience to a safety hazard. The higher the number and level of automated or autonomous operations that a particular vehicle implements, the more challenging an incorrect V2I message may be. That is, when a driver is controlling vehicle operation, an incorrect V2I message may generate a message to the driver (e.g., via an infotainment system of the vehicle) that is confusing. On the other hand, in a fully automated vehicle that relies on sensor and communication information for its operation, an incorrect V2I message may result in incorrect operation. Embodiments of the systems and methods detailed herein relate to detection and reporting of misbehavior in V2I communication.

In accordance with an exemplary embodiment, FIG. 1 is a block diagram of a vehicle 100 that performs detection and reporting of a misbehavior in V2I communication. The exemplary vehicle 100 shown in FIG. 1 is an automobile 101. Alternate embodiments of vehicles 100 include motorcycles, trucks, construction equipment, farm equipment, and automated factory equipment. The vehicle 100 includes a controller 110 that may perform V2V communication with other vehicles 150, as indicated, perform V2I communication with a communication system 165 affixed to infrastructure 160 (e.g., traffic light 170), as indicated, and perform V2X communication with, for example, a cloud server 180, as indicated. As also indicated, a V2I message includes a number of fields of data f0 through fn. The number of fields (i.e., the value of n) and the data in each field may differ based on the type of the V2I message. V2I communications and V2I messages are understood to refer to broadcasts from infrastructure, which may also be referred to as I2V messages, as well as to messages from vehicles.

The controller 110 may also obtain information from one or more sensors 125 to provide alerts to a driver (e.g., via an infotainment system display) or control an operation of the vehicle 100. Exemplary sensors 125 include those that provide information about the environment around the vehicle 100, as well as those that provide information about behavior or operation of the vehicle 100 itself. For example, a radar system 120, camera 130, and lidar system 140 are shown to provide information about the environment around the vehicle 100. This information may include road markings such as the stop bar 175 painted on the roadway, as indicated in FIG. 1. Sensors 125 that provide information about the vehicle 100 itself may include exemplary vehicle sensors 115 such as an inertial measurement unit (IMU), steering angle sensor, and brake sensor. The numbers and locations of the sensors 125 around a vehicle are not limited by the exemplary illustration in FIG. 1.

In addition to performing the communication and control functions, the controller 110 may perform detection and reporting of a misbehavior in V2I communication according to one or more embodiments. As detailed with reference to FIG. 2, the controller 110 may use V2V communication from one or more other vehicles 150 or information from one or more sensors 125 to detect the misbehavior in a given V2I message. The controller 110 may include a database to keep a count of each occurrence of a misbehavior at each location. The count may be used to determine whether or not a misbehavior should be reported (e.g., to the cloud server 180) via V2X communication or other communication. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
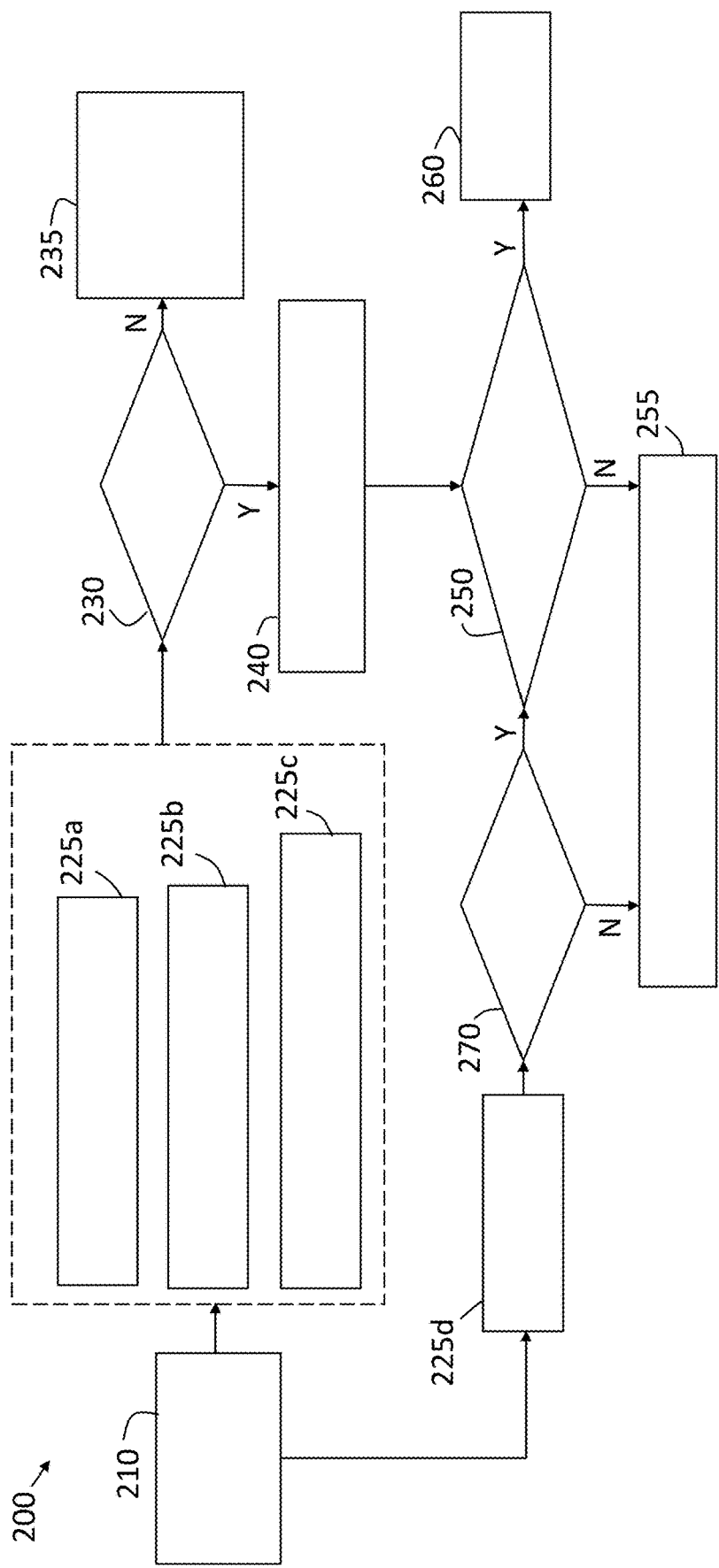
FIG. 2 is a process flow of a method of performing detection and reporting of a misbehavior in V2I communication according to one or more embodiments.

FIG. 2 is a process flow of a method 200 of providing detection and reporting of misbehavior in V2I communication according to one or more embodiments. The processes of the method 200 may be performed by the controller 110, for example. At block 210, receiving a V2I message refers to receiving a message from a communication system 165 affixed to infrastructure 160. A V2I message typically includes a security certificate that may be confirmed. Verification of the V2I message to identify misbehavior is performed at blocks 225a, 225b, 225c, 225d. As detailed, the verification processes at blocks 225a, 225b, 225c are performed prior to the vehicle 100 passing through the area that is relevant to the V2I message. The verification processes at block 225d are performed based on the behavior of the vehicle 100 as it drives through the area that is relevant to the V2I message.

The area that is relevant to a given V2I message varies in size and location based on the type and content of the V2I message. Generally, the area is the geographic region in which the message content may affect operation or behavior of the vehicle 100. For example, a V2I message indicating icy road conditions for the next 3 miles is relevant within those 3 miles. As another example, a V2I message that is a SPaT message regarding a given traffic light 170 is relevant until the vehicle 100 drives past the traffic light 170. As yet another example, a V2I message that indicates the speed limit for a roadway is relevant over the entire length of the roadway until a point at which the speed limit changes.

At block 225a, verifying the V2I message content refers generally to ensuring that the message content broadcast from a communication system 165 affixed to infrastructure 160 is plausible and consistent. This verification may be achieved by checking each field (f0 through fn) of the V2I message based on rules established for the field, for example. Thus, the specific verification processes performed at block 225a may be dependent on the type of the V2I message, because the fields present in the message and, thus, the rules that must be applied vary based on the type of the V2I message.

A first example considers a V2I message regarding a construction zone (i.e., V2I message type is a road safety message (RSM)). If one of the fields of the message (e.g., indicating the speed limit in the construction zone) toggles between two values repeatedly, the message is not consistent and indicates misbehavior. If one or more fields of the message is found to be outside a range established for the field as a rule (e.g., speed limit range is 15 to 35 miles per hour (mph) but the V2I message is indicating a speed limit of 100 mph in the construction zone), then the message is not plausible and indicates misbehavior.

Another example of verification at block 225a involves a V2I message regarding a traffic light 170. That is, the V2I message type is a SPaT broadcast. Exemplary traffic lights 170 may be controlled based on fixed timing intervals, on adaptive timing intervals that are based on traffic flow, or on pressure measurements indicating the presence of a vehicle. Thus, a field of the V2I SPaT broadcast may further define the type of traffic light 170 in order to facilitate accurate verification. In the case of an adaptive timing interval, each V2I message may indicate the current time duration for the light cycle. The field of the V2I message that indicates the time to the next light cycle may be verified based on a comparison with an acceptable range of durations indicated as part of the rule, for example. The order in which lights are illuminated (e.g., green after red, yellow after green) may be another field that is verified according to a rule.

At block 225b, verifying the V2I message is based on V2V messages from other vehicles 150 that precede the vehicle 100 through the area that is relevant to the V2I message. If the behavior of the other vehicles 150, as indicated by the V2V messages, does not match the V2I message, then a misbehavior is determined. For example, if the V2I message at an upcoming intersection indicates a red light as the current state of the traffic light 170 but V2V messages from other vehicles 150 that have just passed through the intersection indicate that they did not stop, the V2I message indicating a red light is determined to be a misbehavior. Similarly, if a V2I message indicates that a lane is closed in a construction zone but V2V messages from other vehicles 150 indicate that those other vehicles 150 traveled in the lane that is indicated as closed, then the controller 110 may also determine a misbehavior.

At block 225c, verifying the V2I message is based on information from one or more sensors 125 (e.g., radar system 120, camera 130, lidar system 140). For example, if a map V2I message at an intersection indicates a particular location for the stop bar painted on the roadway but an image of the roadway obtained with the camera 130 or lidar system 140 of the vehicle 100 indicates a different location for the stop bar, then a misbehavior is determined. Similarly, if a V2I message indicates that a lane is closed in a construction zone but the sensors 125 of the vehicle 100 do not detect the lane closure, then a misbehavior is determined. As previously noted, this misbehavior may have been detected alternately or additionally based on V2V messages. That is, a misbehavior in a V2I message may be identified according to more than one of the verifications at blocks 225a, 225b, 225c, and 225d.

At block 230, a check is done of whether a misbehavior was determined based on the processes at blocks 225a, 225b, or 225c. If not, information in the V2I message is considered valid and, at block 235, autonomous operation of the vehicle 100 may be affected by the V2I message. If the check at block 230 indicates that a misbehavior was detected according to the verification at one or more of the blocks 225a, 225b, and 225c, then, at block 240, the V2I message is disregarded for automated actions of the vehicle 100. The processes at block 250 are then performed.

At block 225d, verifying the V2I message is based on behavior of the driver of the vehicle 100. While the verification processes at blocks 225a, 225b, and 225c may be performed before the vehicle 100 enters the area that is relevant to the V2I message or while the vehicle 100 is within the area that is relevant to the V2I message, the verification processes at block 225d are performed as or after the vehicle 100 leaves the area that is relevant to the V2I message. This is because the operation of the vehicle 100 in the area that is relevant to the V2I message is used as an indication of misbehavior. The vehicle sensors 115 provide information about operation of the vehicle 100 (e.g., whether it slowed, stopped, changed lanes). This information is compared with behavior suggested by the V2I message. For example, if a V2I message at an intersection indicates a red light at the traffic light 170 but the driver of the vehicle 100 proceeded without stopping, then a misbehavior is determined. As another example, the same misbehavior discussed with reference to the processes at blocks 225b and 225c may also be determined based on the processes at block 225d. That is, if a V2I message indicates that a lane is closed in a construction zone but the vehicle 100 proceeded in that lane (i.e., the driver drove in the lane that was indicated as closed), then a misbehavior is determined for the V2I message.

At block 270, a check is done of whether a misbehavior was determined based on the processes at block 225d. If so, the processes at block 250 are performed. As previously noted, the processes at block 250 may also be reached from block 240 (i.e. based on misbehavior determined by the processes at blocks 225a, 225b, or 225c). At block 250, a counter for misbehavior is updated. The counter is particular to a given V2I message at a given location. Additionally, at block 250, the updated counter is checked to determine if the count indicated by the updated counter has exceeded a predefined threshold. If so, reporting misbehavior, at block 260, is performed. This reporting may refer to the controller 110 sending a V2X message from the vehicle 100 to a cloud server 180, for example. The report of the misbehavior may initiate a repair or other mitigation process at the communication system 165 that provided the V2I message. If the check at block 250 indicates that the updated counter has not exceeded the threshold value or if the check at block 270 indicates that there is no misbehavior in the V2I message (received at block 210), then the processes proceed with continuing vehicle operation at block 255.

Updating and checking the counter, at block 250, may be optional. The counter may reduce false alarms regarding a misbehaving communication system 165 affixed to infrastructure 160. For example, if a driver of the vehicle 100 drives through a traffic light 170 even though the V2I message corresponding with the traffic light 170 indicates a red light, the driver may have inadvertently failed to stop. However, if the count associated with that particular V2I message at that particular intersection exceeds the threshold value (updated and checked at block 250), then misbehavior is more likely than driver error. The threshold value may be different for different types of V2I messages. For example, a single determination of misbehavior may be sufficient for reporting of the misbehavior (at block 260) for a V2I message indicating a closed lane in a temporary work zone. On the other hand, a V2I message indicating a speed limit may be associated with a higher threshold value because of the higher likelihood that the driver of the vehicle 100 and other vehicles 150 may simply disregard a valid speed limit. Use of the counter can reduce the cost of generating and sending the report to the cloud server 180, as well as the cost of processing the report by the cloud server 180.

A given area may be associated with more than one V2I message. For example, at an intersection with a traffic light 170, a SPaT V2I message may indicate information about the cycles of the light itself while a map V2I message indicates the location of the stop bar drawn on the roadway. In this case, both V2I messages must be verified according to the method 200 shown in FIG. 2.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method in a vehicle, the method comprising:
receiving, using a controller of the vehicle, a vehicle-to-infrastructure (V2I) message transmitted from a communication system affixed to infrastructure at a location, wherein the V2I message includes at least one category of information among a plurality of categories of information and the plurality of categories of information include map-based information and road safety information;
determining, using the controller, based on performing at least one type of verification, whether a misbehavior has occurred with respect to the V2I message, wherein the misbehavior indicates incorrect information in the V2I message, and wherein the performing at least one type of verification includes checking consistency of each field of the V2I message by determining that the misbehavior has occurred when one of the fields of the message toggles between two values repeatedly;
maintaining, using the controller, a counter of a number of times the misbehavior has occurred with respect to the V2I message at the location; and
reporting the misbehavior based on the counter.

2. The method according to claim 1, wherein the determining whether the misbehavior has occurred is performed prior to the vehicle passing through an area to which the V2I message pertains.

3. The method according to claim 2, further comprising disregarding the V2I message based on determining that the misbehavior has occurred.

4. The method according to claim 2, wherein the performing at least one type of verification includes comparing information in the V2I message with information obtained from one or more other vehicles via vehicle-to-vehicle (V2V) messages.

5. The method according to claim 2, wherein the performing at least one type of verification includes checking plausibility of each field of the V2I message based on rules corresponding with each field.

6. The method according to claim 2, wherein the performing at least one type of verification includes comparing information in the V2I message with information obtained with one or more sensors of the vehicle.

7. The method according to claim 1, wherein the performing at least one type of verification includes comparing driver behavior to expected driver behavior based on information in the V2I message.

8. The method according to claim 1, further comprising maintaining, by the controller, a counter threshold value that is specific to each type among a plurality of types of V2I messages, wherein one type among the plurality of types is a signal phase and time (SPaT) V2I message associated with a traffic light.

9. The method according to claim 8, further comprising determining the type of the V2I message, wherein the reporting the misbehavior is based on the counter of the number of times the misbehavior has occurred exceeding the counter threshold value that is specific to the type of the V2I.

10. The method according to claim 1, further comprising receiving a second V2I message at the location and determining whether a misbehavior has occurred with respect to the second V2I message.

11. A vehicle comprising:
one or more sensors, the one or more sensors including a camera; and
a controller configured to receive a vehicle-to-infrastructure (V2I) message transmitted from a communication system affixed to infrastructure at a location, wherein the V2I message includes at least one category of information among a plurality of categories of information and the plurality of categories of information include map-based information and road safety information, to determine, based on performing at least one type of verification, the at least one type of verification including checking consistency of each field of the V2I message by determining that the misbehavior has occurred when one of the fields of the message toggles between two values repeatedly, whether a misbehavior has occurred with respect to the V2I message, wherein the misbehavior indicates incorrect information in the V2I message, to maintain a counter of a number of times the misbehavior has occurred with respect to the V2I message at the location, and to report the misbehavior based on the counter.

12. The vehicle according to claim 11, wherein the controller is configured to determine whether the misbehavior has occurred prior to the vehicle passing through an area to which the V2I message pertains.

13. The vehicle according to claim 12, wherein the controller is configured to disregard the V2I message based on determining that the misbehavior has occurred.

14. The vehicle according to claim 12, wherein the controller is configured to compare information in the V2I message with information obtained from one or more other vehicles via vehicle-to-vehicle (V2V) messages to identify the misbehavior.

15. The vehicle according to claim 12, wherein the controller is configured to check plausibility of each field of the V2I message based on rules corresponding with each field to identify the misbehavior.

16. The vehicle according to claim 12, wherein the controller is configured to compare information in the V2I message with information obtained with one or more sensors of the vehicle to identify the misbehavior.

17. The vehicle according to claim 11, wherein the controller is configured to compare driver behavior to expected driver behavior based on information in the V2I message to identify the misbehavior.

18. The vehicle according to claim 11, wherein the controller is configured to maintain a counter threshold value that is specific to each type among a plurality of types of V2I messages, wherein one type among the plurality of types is a signal phase and time (SPaT) V2I message associated with a traffic light.

19. The vehicle according to claim 18, wherein the controller is further configured to determine the type of the V2I message and report the misbehavior based on the counter of the number of times the misbehavior has occurred exceeding the counter threshold value that is specific to the type of the V2I.

20. The vehicle according to claim 11, wherein the controller is configured to receive a second V2I message at the location and determine whether a misbehavior has occurred with respect to the second V2I message.

\* \* \* \* \*